(12) United States Patent
Gish et al.

(10) Patent No.: US 9,879,944 B1
(45) Date of Patent: Jan. 30, 2018

(54) SYSTEMS AND METHODS FOR COOPERATION AMONG WEAPONS, HOLSTERS, AND RECORDERS

(71) Applicant: TASER International, Inc., Scottsdale, AZ (US)

(72) Inventors: Michael E. Gish, Phoenix, AZ (US); Mark A. Hanchett, Mesa, AZ (US); Ryan C. Markle, Peoria, AZ (US); John W. Wilson, Phoenix, AZ (US); Daniel J. Wagner, Scottsdale, AZ (US)

(73) Assignee: TASER INTERNATIONAL, INC., Scottsdale, AZ (US)

( * ) Notice: Subject to any disclaimer, the term of this patent is extended or adjusted under 35 U.S.C. 154(b) by 242 days.

(21) Appl. No.: 14/247,902

(22) Filed: Apr. 8, 2014

(51) Int. Cl.
   *H04N 9/00* (2006.01)
   *F41C 33/02* (2006.01)
   *H04N 7/18* (2006.01)
   *F41C 33/00* (2006.01)

(52) U.S. Cl.
   CPC .......... *F41C 33/029* (2013.01); *F41C 33/008* (2013.01); *H04N 7/188* (2013.01)

(58) Field of Classification Search
   CPC ...... F41C 33/029; F41C 33/008; F41C 33/02; F41C 33/0209; F41C 33/0218; F41C 33/0227; F41C 33/0236; F41C 33/0263; F41C 33/06; H04N 7/188
   USPC .......... 348/143; 42/70.01, 99; 224/183, 192, 224/198, 238, 243, 911–912
   See application file for complete search history.

(56) References Cited

U.S. PATENT DOCUMENTS

| | | | |
|---|---|---|---|
| 3,530,451 A | 1/1967 | Devine | |
| 4,713,889 A * | 12/1987 | Santiago | F41C 33/0227 224/246 |
| 5,479,149 A * | 12/1995 | Pike | F41C 33/0209 340/539.1 |
| 5,525,966 A | 6/1996 | Parish | |
| 5,828,301 A | 10/1998 | Sanchez | |
| 6,641,009 B2 | 11/2003 | French | |
| 6,735,907 B2 | 5/2004 | Stevens | |
| 6,831,556 B1 | 12/2004 | Boykin | |
| 6,918,519 B2 | 7/2005 | Vor Keller | |
| 7,158,167 B1 | 1/2007 | Yerazunis | |
| 7,168,198 B2 | 1/2007 | Newkirk | |
| 7,389,604 B2 | 6/2008 | Newkirk | |
| 7,525,568 B2 | 4/2009 | Raghunath | |
| 7,714,720 B2 | 5/2010 | Hietanen | |
| 7,937,880 B1 | 5/2011 | Fidlow | |
| 8,752,741 B2 | 6/2014 | Stevens | |
| 8,752,742 B2 | 6/2014 | Clark | |
| 9,135,808 B2 | 9/2015 | Johnson | |
| 9,140,509 B2 | 9/2015 | Sullivan | |

(Continued)

FOREIGN PATENT DOCUMENTS

| | | |
|---|---|---|
| KR | 20000037802 | 7/2000 |
| WO | WO2013191648 | * 12/2013 |

*Primary Examiner* — Farzana Hossain
(74) *Attorney, Agent, or Firm* — Lawrence Letham

(57) ABSTRACT

A holster broadcasts a message indicating that a weapon has been removed from the holster. A recorder, in response to authenticating the message, controls recording of audio and video. The message may include an identifier of the holster. The recorder may maintain a white list of identifications and ignore messages with identifications that are not on the white list. The message, instead of being broadcast, may be transmitted with an address of an intended recorder.

20 Claims, 4 Drawing Sheets

(56) References Cited

U.S. PATENT DOCUMENTS

| | | |
|---|---|---|
| 9,217,616 B2 | 12/2015 | Sullivan |
| 9,336,663 B1 | 5/2016 | Cohen |
| 2002/0153396 A1* | 10/2002 | French ............... F41C 33/0209 224/244 |
| 2005/0002668 A1 | 1/2005 | Gordon |
| 2005/0224537 A1* | 10/2005 | Rassias ................ F41A 17/02 224/243 |
| 2006/0082730 A1 | 4/2006 | Franks |
| 2006/0098088 A1* | 5/2006 | Raghunath ............ H04N 5/782 348/61 |
| 2007/0028501 A1 | 2/2007 | Fressola |
| 2007/0257987 A1 | 11/2007 | Wang |
| 2008/0061991 A1* | 3/2008 | Urban ................ F41C 33/0209 340/573.1 |
| 2008/0112698 A1* | 5/2008 | Ray ....................... G03B 29/00 396/56 |
| 2009/0207252 A1 | 8/2009 | Raghunath |
| 2010/0289648 A1 | 11/2010 | Ree |
| 2012/0233384 A1* | 9/2012 | Charles ............. F15B 11/0365 711/103 |
| 2012/0276954 A1* | 11/2012 | Kowalsky ............ H04N 5/2252 455/556.2 |
| 2013/0217332 A1* | 8/2013 | Altman ................ H04H 60/90 455/41.2 |
| 2014/0038668 A1* | 2/2014 | Vasavada ............ H04L 65/4061 455/556.1 |
| 2014/0162584 A1 | 6/2014 | Cope |
| 2015/0147970 A1* | 5/2015 | Tan ....................... H04W 12/08 455/41.2 |
| 2015/0184978 A1* | 7/2015 | Hedeen ..................... F41G 1/35 42/114 |
| 2015/0198406 A1* | 7/2015 | Ling ................... F41C 33/0254 42/90 |
| 2015/0254968 A1 | 9/2015 | Sanders |
| 2015/0369554 A1 | 12/2015 | Kramer |
| 2015/0369559 A1 | 12/2015 | Del Rosario |
| 2016/0033221 A1 | 2/2016 | Schmehl |
| 2016/0086472 A1 | 3/2016 | Herrera |
| 2016/0165192 A1 | 6/2016 | Saatchi |
| 2016/0173832 A1 | 6/2016 | Stewart |
| 2016/0241807 A1 | 8/2016 | Kovac |
| 2017/0003101 A1 | 1/2017 | Madrid |
| 2017/0034405 A1 | 2/2017 | Ryniec |
| 2017/0054951 A1 | 2/2017 | Weekly |
| 2017/0059265 A1 | 3/2017 | Winter |
| 2017/0061781 A1 | 3/2017 | Ware |
| 2017/0074617 A1 | 3/2017 | Stewart |

* cited by examiner

SYSTEMS AND METHODS FOR COOPERATION AMONG WEAPONS, HOLSTERS, AND RECORDERS

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF THE PREFERRED EMBODIMENTS INVENTION

Figure 1:
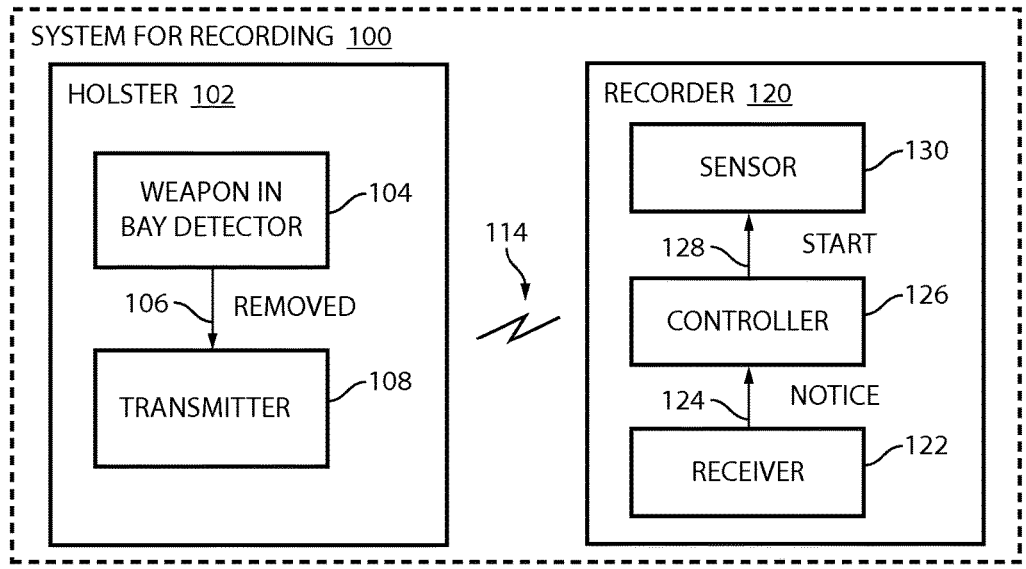
FIG. 1 is a functional block diagram of a system for recording according to various aspects of the present invention.

For self defense and/or law enforcement purposes, a person may carry a weapon and a video and audio (A/V) recorder that records what can be sensed from the person's (i.e., the user's) point of view. Conventional A/V recorders may be operated in a non-recording or compromised recording mode (e.g., low resolution, visible light only, infrared light only, intensity only as opposed to full color, non-streaming), for example, to save power, limit radio communication from the A/V recorder, or reserve a limited recording capability for more important occurrences in the user's surroundings. According to various aspects of the present invention, the removal by the user of a weapon from a holster causes cooperation among the weapon, the holster, and A/V recorder. In one important class of implementations of the present invention, the A/V recorder is controlled to begin uncompromised recording and/or streaming of audio and/or video describing the user's point of view.

A holster includes any apparatus for supporting a weapon on a person for carrying by the person. A weapon includes any conventional device for self protection including a firearm, a knife, a stun gun, a pepper spray dispenser, a conducted electrical weapon of the type manufactured by TASER International, Inc., to name a few representative types of weapons. A holster may be formed in any conventional manner to suitable support one or more desired types of weapons. According to various aspects of the present invention, a holster further includes the capability to detect removal of a weapon from the holster and to broadcast or transmit a message in response to such removal. A bay of a holster includes any structure that supports the weapon for being carried by the user of the holster.

A recorder includes any apparatus for creating and/or maintaining a record of light and/or sound within a range of detecting around the recorder. A recorder includes any conventional A/V recorder, still image camera, and audio recorder including those based on analog and/or digital sensing and/or recording technologies. According to various aspects of the present invention, a recorder further includes the capability to receive a message and control recording in response to the message. In one important class of implementations of the present invention, a recorder further determines the authenticity of the message before responding to it.

For example, system for recording 100 of FIGS. 1-6 includes holster 102 and recorder 120. Holster 102 includes weapon in bay detector 104, and transmitter 108. Recorder 120 includes receiver 122, controller 126, and sensor 130.

A weapon in bay detector includes any apparatus that detects that the holster is no longer supporting a weapon. In one important class of weapon in bay detectors, the apparatus detects presence and/or absence of a weapon in the bay. In another important class of weapon in bay detectors, the apparatus detects a change in the amount of support the bay is providing to the weapon. A weapon in bay detector provides a signal responsive to detection. Any conventional detection and signaling technology may be used (e.g., magnetic field disrupted by ferromagnetic material of the weapon, pressure of the weapon against a capacitive or piezo electric component, tuned circuit detuned by permeable or dielectric material of the weapon).

According to various aspects of the present invention, weapon in bay detector 104 provides REMOVED signal 106 in response to detecting removal of a weapon from holster 102. Detection is accomplished with a circuit that is responsive to monitoring a voltage, a current, a resistance, a magnetic field, or an electric field that changes in response to removal of the weapon from the bay of holster 102.

A transmitter includes any apparatus for sending a signal via a medium that does not require a physical connection between the transmitter and any one or more receivers coupled for communication to the medium. For example, the medium may be free space, air, or water. Any conventional communications technologies may be used (e.g., radio, infrared light, ultrasound). For example, transmitter 108 responds to REMOVED signal 106 by transmitting a REMOVED message 114. The message may comply with a conventional protocol. The message may be directed to an intended receiver or group of receivers (e.g., directional antenna, addressed to the receiver or to a group of receivers according to the protocol). The message may be broadcast, that is transmitted (e.g., using omnidirectional technology) without indication of the identity or location on an intended receiver.

A receiver includes any apparatus for receiving a message conveyed by a medium. Any conventional receiver technologies may be used. For example, receiver 122 receives REMOVED message 114 and applies processes that comply with conventional protocols to provide NOTICE signal 124 in accordance with the fact that a REMOVED message was received and/or information derived from message 114.

Transmitter 108 operates without feedback from receiver 122. Consequently, REMOVED message 114 with essentially the same information may be received in a series of broadcasts describing one removal event indicated by REMOVED signal 106. Receiver 122 may screen redundant copies according to a protocol so as to provide NOTICE signal 122 with less redundancy (e.g., all messages received in a period of 5 seconds are considered as one removal event).

In another implementation, transmitter 108 determines a date and time in any conventional manner and REMOVED message 114 includes a date and time of the removal event to which the message pertains. Receiver 122 determines redundant REMOVED messages 114 based on a comparison of the date and time of the removal event indicated in the message. Receiver 122 may provide NOTICE signal 124 with the date and time of the removal event.

A controller includes any circuitry for controlling a sensor. Any conventional analog, digital, configurable (ROM, programmed logic), and/or stored program processing circuitry technologies may be used including conventional programming languages for developing a configuration and/or stored program. For example, controller 126 responds to NOTICE signal 124 by providing START signal 128 to sensor 130.

START signal 128 represents any suitable quantity of commands, settings, or dialogs that accomplish controlling recording (e.g., change manner of sensing and/or recording). The control may affect timing of image capture (e.g., still, video), for example, rate of capture (e.g., ceasing still image capture and beginning video capture, changing a frame rate of video). The control may affect resolution of image capture (e.g., increasing resolution, increasing number of colors from intensity to full color, adjusting compression of video for less lossy compression or lossless compression). The control may affect sensitivity of the sensor (e.g., different frequency and/or dynamic range of light and/or sound).

When sensor 130 includes memory for recording, the control may manage that memory to facilitate recording (e.g., cease using memory as a ring buffer and begin using memory as a linear buffer to avoid loss of recorded information).

Controller 126 may include memory for recording. Controller 126 may manage this memory in response to NOTICE signal 124 in an analogous manner as managing memory in sensor 130.

For example, controller 126 responds to each NOTICE signal 124 by providing START signal 128 that applies operating power to sensor 130 so enabling recording. In other implementations, START signal may accomplish any control of sensor 130 discussed herein.

A sensor includes any apparatus that detects light and/or sound to provide information describing the light and or sound over a period of time. A sensor may use any conventional technologies for detecting and/or providing information. A sensor may comply with any conventional information storage or communication protocol for storing information describing the light and/or sound. For example, sensor 130 includes a charge coupled device light detector, a microphone, and a processor that formats audio and video information according to the MPEG-4 standard.

Sensor 130 responds to START signal 128 to comply with controls intended by controller 126 and as discussed above. Recordings (e.g., data, settings, GPS location, date and time, still images, audio, video) may be transferred out of recorder 120 in any conventional manner (e.g., electrical, optical, or radio output port; removable memory; A/V speaker/display).

In operation of system 100, a user wears holster 102 and wears recorder 120 on clothing or accessories. For example, holster 102 may be supported by a belt around the user's waist. Recorder 120 may be supported by an eye glasses frame. Consequently, communication via REMOVED message 114 may be accomplished with short range low power signaling technologies. For example communication may be in accordance with the conventional Bluetooth Low Energy (BTLE) communication standard marketed by Bluetooth SIG, Inc. REMOVED Message 114 may be an advertisement consistent with BTLE. When a conventional sidearm is removed from holster 102, sensor is controlled to assure recording from that time forward will be at a maximum resolution and maximum frame rate of video.

In another implementation, in an analogous manner, when the sidearm is returned to holster 102, weapon in bay detector 104 may provide RETURNED signal 106 to that effect to transmitter 108. RETURNED message 114 again is broadcast or transmitted and received. A suitable NOTICE signal 124 from receiver 122 causes controller 126 to provide a suitable START signal so as to start, for example, a low power, low resolution, ring buffering mode of recording by sensor 130.

According to various aspects of the present invention, one or more implementations of holsters and one or more implementations of recorders may be combined to form a system for recording as discussed above. For example, holster 202, of FIG. 2, may be used in place of holster 102 in another system for recording where a holster is desired to use less power. Recorder 320, of FIG. 3 may be used in place of recorder 120 in another system for recording where a recorder with additional communication capability is desired.

A power supply provides low voltage current to operate electromechanical apparatus and/or circuitry. A conventional battery may be used.

A weapon in bay switch is a type of weapon in bay detector 104, as discussed above, that closes in response to detecting that a weapon has been removed from the bay of a holster and remains open in response to detecting that a weapon is currently in the bay. Any conventional detection and switching technology may be used.

Figure 2:
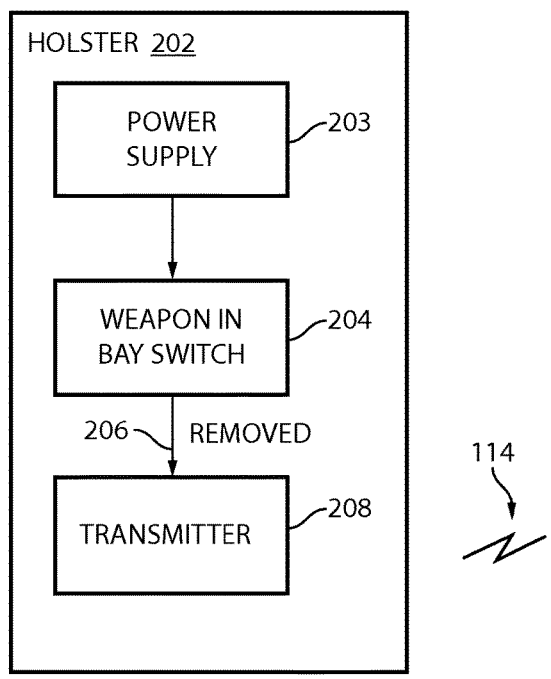
FIG. 2 is a functional block diagram of a holster for use in place of holster 102 in a system otherwise analogous to the system of FIG. 1.

Holster 202 of FIG. 2 includes power supply 203, weapon in bay switch 204, and transmitter 208. Power supply 203 provides low voltage current to operate weapon in bay switch 204 and transmitter 208. Transmitter 208 is analogous in structure and function to transmitter 108, discussed above.

Weapon in bay switch 204, in response to detecting presence of a weapon in the bay of holster 102, opens and remains open for as long as the weapon remains in the bay. In response to detecting removal of the weapon from the bay, weapon in bay switch 204 may close for a predetermined amount of time or close for as long as the weapon is absent from the bay. Detection may be accomplished with an electromechanical apparatus that is responsive to a magnetic field and/or an electric field that changes in response to removal of the weapon from the bay of holster 202. Any conventional electro-optical detection and/or electromechanical detection may be used. Any switching technology may be used (e.g., conventional proximity switches, photo-optic switches, reed switches).

Weapon in bay switch 204 when closed couples power supply 203 to transmitter 208. Signal REMOVED 206 from weapon in bay switch 204 enables transmitter 208 to consume power from power supply 203 and thereby broadcast message 114 as discussed above. In one implementation, signal REMOVED 206 supplies low voltage current to transmitter 208. In another implementation, signal REMOVED 206 controls power consumption by transmitter 208 (e.g., releasing transmitter 208 from a low power, hibernation mode of operation).

A transceiver includes any circuitry that transmits and receives for maintaining a communication link with one or more other transceivers. Any conventional signaling technologies and communication technologies (e.g., protocols, standards, protocol stacks) may be used. Integrated circuitry is preferred for small size and low power consumption. Programmable circuits using conventional program development technology may be used. An implementation that combines the functions of transmitter 108 and receiver 122, discussed above, may be used as one local area transceiver. To support one or more links, a transceiver may be coupled to a controller for complying with protocols, managing message buffers, and following communication logic (e.g., to retry when messages are not acknowledged, to join an ad hoc network).

A local area transceiver, as used herein, is a type of transceiver as discussed above that employs relatively low power transmissions and relatively low sensitivity receivers to accomplish communication over one or more links. Each link may have a distance shorter than 6 feet (2 m). These short distance capabilities are useful for communications among electronics intended to be used in concert by one person. Higher power transmissions and relatively higher receiver sensitivity may be used where interference with other systems is otherwise unlikely.

A wide area transceiver, as used herein, is a type of transceiver as discussed above that employs relatively high power transmissions and relatively high sensitivity receivers to accomplish communication over one or more links. Each link may have a distance in the range of 10 feet (3 m) to 2000 feet (600 m).

A memory includes any digital circuitry for storing program instructions and/or data. Storage may be organized in any conventional manner (e.g., program code, buffer, ring buffer). Data may include program variables, instructions, messages, still images, audio, and/or video. Memory may be incorporated in and/or accessible by a transmitter, a receiver, a transceiver, a sensor, a controller, and programmable circuitry (e.g., processors, sequential logic).

Figure 3:
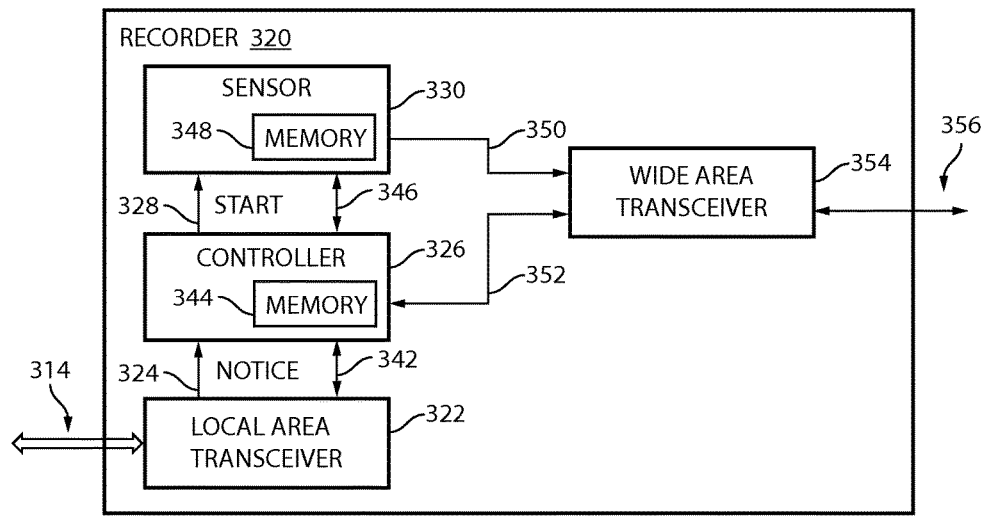
FIG. 3 is a functional block diagram of a recorder for use in place of recorder 120 in a system otherwise analogous to the system of FIG. 1.

Recorder 320 of FIG. 3 includes local area transceiver 322, controller 326, sensor 330 and wide area transceiver 354. Local area transceiver 322 receives REMOVED message 114 and provides NOTICE signal 324 in a manner analogous to that discussed with reference to FIG. 1.

In another implementation of a holster (not shown), transmitter 108 is replaced with a local area transceiver compatible with local area transceiver 322; and, REMOVED message 314, analogous to REMOVED message 114, is communicated over a link. The link may be established in any conventional manner (e.g., Bluetooth protocol, BTLE protocol, a piconet protocol). For example, the holster may advertise its availability as a slave network node; and, a recorder may establish itself as a master network node with respect to the slave. After the link is established, both nodes may maintain the link indefinitely. When a weapon in bay detector 104 indicates (106) that a weapon has been removed from holster 102, the holster's local area transceiver transmits REMOVED message 314 over the link. REMOVED message 314 may omit an address for broadcasting, may include one address for transmitting to one node (e.g., its master), or include a group address for broadcast to a group of nodes within the local area.

When recorder 320 communicates with one or more holsters over one or more links, local area transceiver 322 exchanges data using signals 342 to controller 326. Local area transceiver 322 may access memory 344 of controller 326 as discussed above. Local area transceiver 322 may respond to receiving REMOVED message 314 that indicates a weapon is removed from holster 102 by NOTICE signal 324 and/or data transfer using signals 342.

Controller 326 includes memory 344. Controller 326 receives NOTICE signal 324 and responds by providing START signal 328 as discussed above with reference to controller 126. Controller 326 exchanges data (e.g. instructions, variables, messages) 324 with local area transceiver 322 for communicating with holsters, as discussed above. Controller 326 exchanges data (e.g. controls, instructions, variables) 346 with sensor 330 to supplement or replace START signal 328. Controller 326 may exchange other data (e.g., images, audio, video) with sensor 330 to accomplish communication regarding recording via a local area network 314 (via signals 342) and/or a wide area network 356 (via signals 352).

Sensor 330 is analogous in structure and function to sensor 130, discussed above. Sensor 330 further includes memory 348 and exchanges data with controller 326 via signals 346. In addition to the manner of responding to a START signal as discussed above, sensor 330 may, in response to removal of a weapon from a holster (e.g., signal 328 and/or signals 346), initiate and/or participate in data transfer to/from controller 326 and/or data transfer to/from wide area transceiver 354. Such data transfer may include reporting a status of sensor 330, a configuration of sensor 330, streaming data (e.g., still image sequence, audio, video), and/or recorded data (e.g. still images, audio, video) from memory 348 and/or memory 344.

Wide area transceiver 354 initiates, maintains, and/or participates in one or more links 356 to other wide area transceivers to exchange data into and out of recorder 320. Wide area transceiver 354 may receive data from sensor 330 via signals 350 in any conventional manner as discussed above. To support such communication, wide area transceiver 354 cooperates with controller 326 via signals 352 in any conventional manner. Such data transfer may include reporting a status of recorder 320, a configuration of recorder 320, streaming a recording (e.g., still image sequence, audio, video), and/or a prior recording (e.g. still images, audio, video) from memory 348 and/or memory 344 in addition to data transfer from sensor 330 discussed above.

A terminal includes any structure that serves as an endpoint of a circuit. A terminal is suitable for coupling a signal through the terminal to another terminal. A terminal for an electric circuit and a current or voltage signal comprises a conductor for providing or receiving the signal. A terminal for an optical circuit and a light signal comprises a light source or a light responsive component (e.g., photoresistor, photoswitch, photosemiconductor). A terminal for an acoustic circuit for providing an ultrasound signal comprises a sound source and a sound responsive component. A terminal for a magnetic circuit and a magnetic flux signal may be part of a core of an autotransformer or transformer. A terminal for a capacitive circuit and a charge or electric field signal comprises a plate of a capacitor and may further comprise a dielectric. A terminal for coupling a radio frequency signal may include an antenna, strip line, wave guide, and/or all or part of a tuned circuit. Any terminal as discussed above may be implemented with conventional mechanical, electrical, optical, acoustic, magnetic, and/or capacitive technologies.

An attractor includes any structure that attracts a moveable object toward a suitable position and away from an unsuitable position. For example, a magnet may attract a moveable object made of ferromagnetic material. Any conventional physical phenomena for attraction may be used. If the force of attraction supplied by the attractor is greater than other forces acting on the moveable object, then the moveable object moves in accordance with a vector sum of the forces.

Figure 4:
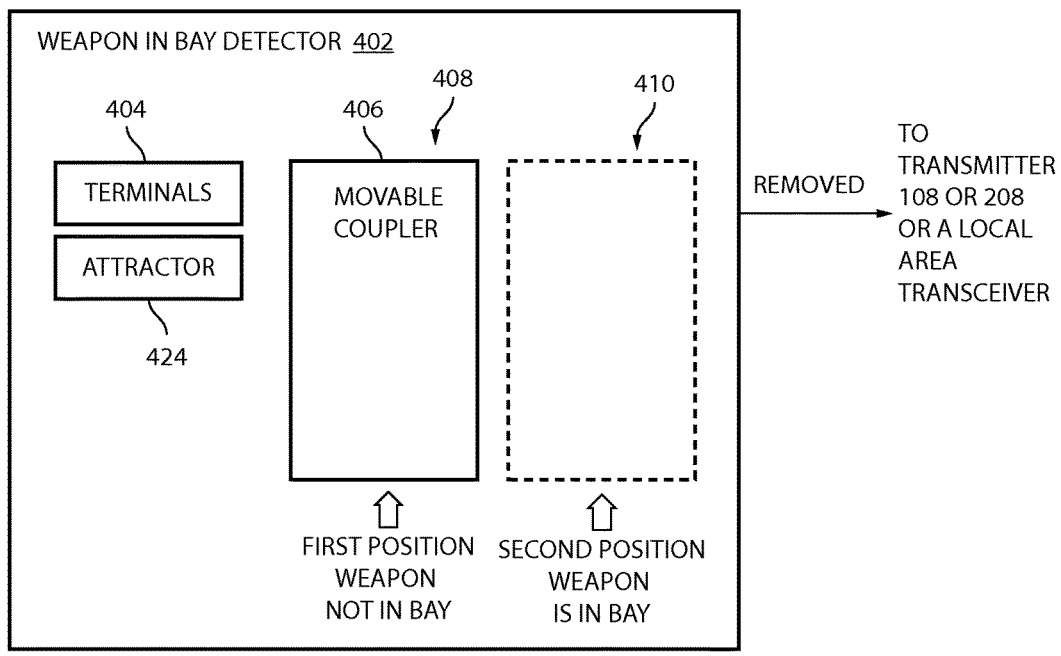
FIG. 4 is a functional block diagram of a weapon in bay detector according to various aspects of the present invention.

Weapon in bay detector 402 of FIG. 4 is a type of weapon in bay detector 104 as discussed above for use in holster 102. Weapon in bay detector 402 provides a REMOVED signal for use by transmitter 108 or 208 (or a local area transceiver as discussed above) in accordance with removal of a weapon from (or nonexistence of a weapon in) a bay of holster 102. Weapon in bay detector 402 includes terminals 404, attractor 424, and movable coupler 406.

Moveable coupler 406 is an object that is capable of being attracted to attractor 424 as discussed above. Moveable coupler 406 is also capable of being attracted to a weapon located in the bay of holster 102. A force of attraction to the weapon is greater than a force of attraction to attractor 424 and overwhelms the force of attraction by attractor 424. Moveable coupler 406 may rest in a first position 408 when a weapon is not in a bay of holster 102 or in a second position 410 when a weapon is in a bay of holster 102. In the absence of a weapon in the bay of holster 102, the force of attraction between moveable coupler 406 and attractor 424 is sufficient to move moveable coupler 406 away from second position 410 and into first position 408. In the presence of a weapon in a bay of holster 102, the force of attraction between moveable coupler 406 and the weapon overwhelms the force of attraction between attractor 424 and moveable coupler 406. Consequently, moveable coupler 406 moves away from first position 408 and into second position 410.

In one position of first position 408 and second position 410, herein called the active position, moveable coupler 406 uniquely couples terminals 404 so that a particular signal is coupled through at least one terminal of terminals 404 to at least one other terminal of terminal 404. Such coupling does not occur when moveable coupler 406 is not in the active position (i.e. in what is herein called the inactive position). Weapon in bay detector 402 may be designed to provide the REMOVED signal only when the moveable coupler is in the active position (positive coupling logic). In an alternate and functionally equivalent implementation, weapon in bay detector 402 may be designed to provide the REMOVED signal only when the movable coupler is in the inactive position (negative coupling logic). With either positive or negative coupling logic, signal REMOVED (e.g., 106, 206) is provided either as coupled between terminals of terminal 404 and then output, or as an output from a suitable circuit (not shown) designed to be responsive to the coupling logic. In another implementation, terminals 404 and movable coupler 406 cooperate as a switch for use as a weapon in bay switch 204 discussed above with reference to FIG. 2.

Figure 5:
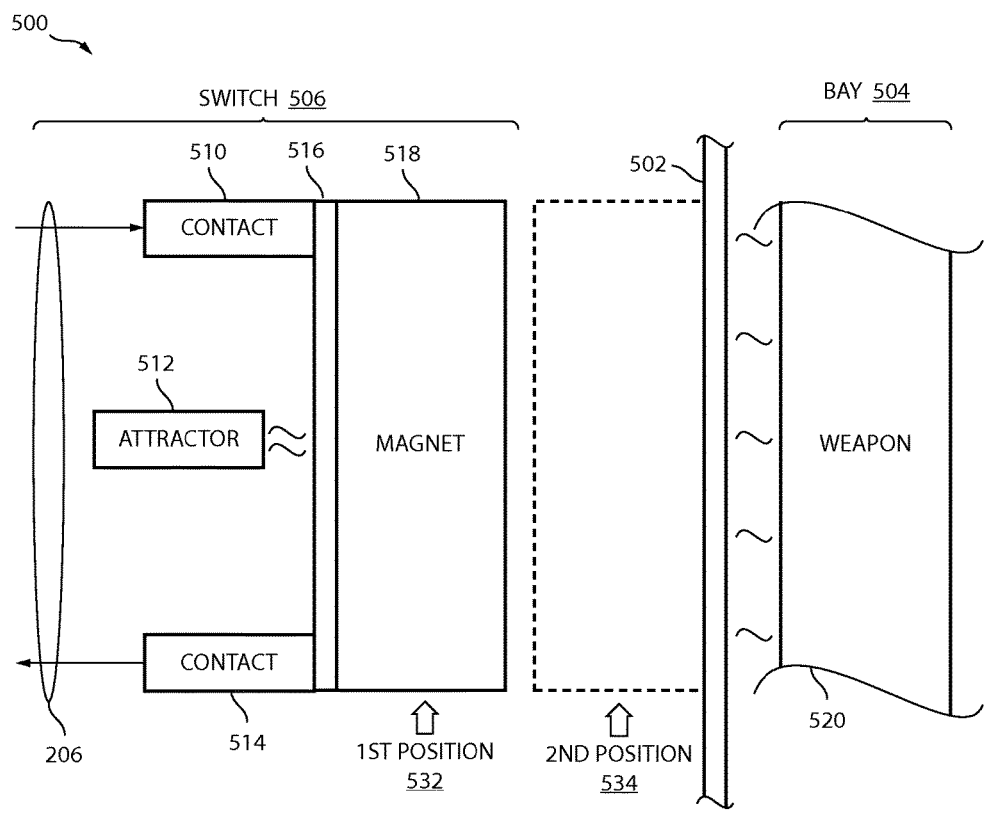
FIG. 5 is a functional block diagram of another weapon in bay detector according to various aspects of the present invention.
Figure 6:
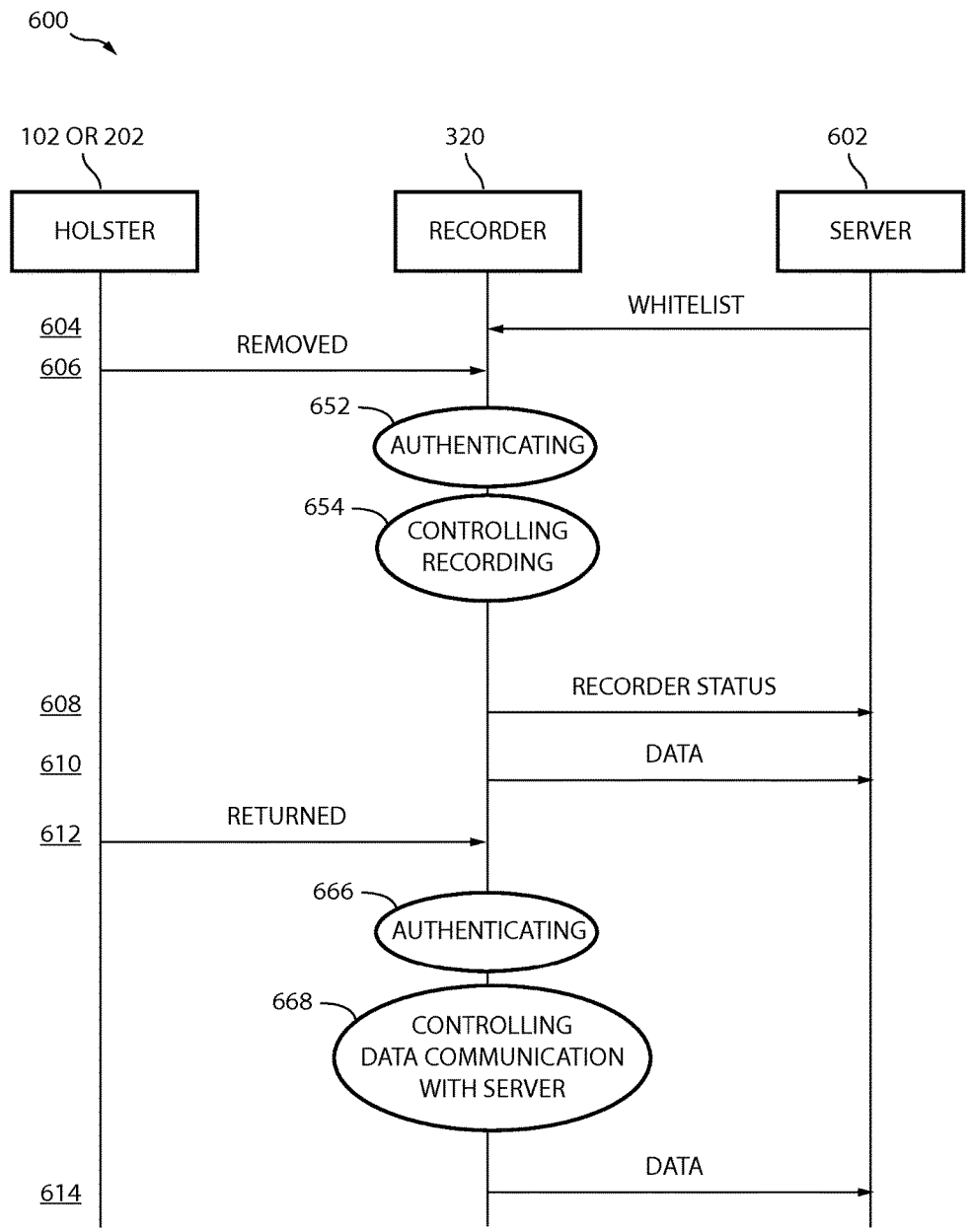
FIG. 6 is a message sequence diagram for communications among a holster, a recorder, and a server, according to various aspects of the present invention.

Weapon in bay detector 500 of FIG. 5 is an implementation of weapon in bay detector 402 for use with weapons that comprise a significant amount of ferromagnetic material. Weapon in bay detector 500 may serve as a replacement for weapon in bay detector 104 or weapon in bay switch 204, as discussed above. Weapon in bay detector 500 is shown in functional relationship to a wall 502 of a bay 504 of holster 102 and a portion of a weapon 520 located in bay 504. Weapon in bay detector 500 outputs REMOVED signal 206 when switch 506 is closed (i.e., conducting) and does not output REMOVED signal 206 when switch 506 is open (i.e., nonconducting).

A wall defines all or part of a bay. A wall may cooperate with a weapon to support the weapon, pass electromagnetic fields between the weapon and a weapon in bay detector, and/or to abut the weapon so the pressure from presence of the weapon in a resilient bay is applied through the wall to a weapon in bay detector. For example, wall 502 passes magnetic flux between weapon 520 and weapon in bay detector 500.

Switch 506 includes contact 510, attractor 512, contact 514, conductor 516, and magnet 518. In switch 506, contacts 510 and 514 are an implementation of terminals 404. Moveable coupler 406 corresponds in function to magnet 518 and conductor 516. Conductor 516 is fixed onto a face of magnet 518 and moves with magnet 518.

In an implementation of weapon in bay detector 500 as a weapon in bay switch, one of contacts 510 and 514 is coupled to receive power from power supply 203. The other contact of contacts 510 and 514 is coupled to transmitter 208.

In the absence of a weapon 520 in bay 504, magnet 518 is attracted by attractor 512 (e.g., a mass of steel) away from second position 534 to rest at first position 532 where conductor 516 is pressed against (abuts) contacts 510 and 514 closing switch 506. In the presence of weapon 520 in bay 504, magnet 518 is affected by considerable magnetic attraction toward weapon 520 that overwhelms the attraction force of attractor 512. Magnet 518 therefore moves away from first position 532 to rest at second position 534. As conductor 516 separates from contacts 510 and 514, switch 506 opens and remains open while weapon 520 is present in bay 504.

In an implementation where magnet 518 has suitable conductivity, conductor 516 is omitted.

In another implementation of switch 506, the front faces of contacts 510 and 514 that abut conductor 516 when switch 506 is closed define a plane. Attractor 512 is located between contacts 510 and 514 and not in the plane.

A message may include indicia identifying the source of the message. By including indicia identifying the source of the message, a receiver may avoid taking action on received messages that are not appropriate for the receiver and/or not authentic. For example, transmitter 108, 208, or a local area transceiver that is part of a holster 102, 202, as discussed above, may format and send (e.g., transmit, broadcast) a message to include indicia identifying the holster. A recorder that receives such a message may determine whether to avoid action in response to the message by rejecting messages that do not satisfy predetermined criteria. Action taken by a recorder may include controlling recording as discussed above. Criteria are designed to make messages that are not authentic unlikely to be considered authentic.

Indicia identifying the source of a message may include an address and/or a signature. Any conventional address may be used. A message may include in sequence: a header, a payload, and a postscript. The header and postscript may be defined by any conventional communication protocol or standard (e.g., BTLE). The header may include indicia identifying the source and may further include indicia identifying one or a group of intended receivers. The message header, according to the protocol being implemented, may reduce the possibility of responding to a message that is not formatted in compliance with the protocol.

A payload is a portion of a message that conveys information for performing a function of the system in which communication occurs. For example, in system 100, a payload may include indicia of whether a weapon has been removed from a bay of holster 102. According to various aspects of the present invention, a message transmitted or broadcast from a holster may include a payload that includes a signature.

To simplify communication in system 100, as discussed above, transmission of one or more messages may indicate that a weapon has been removed from a bay of holster 102 and absence of such transmitted messages consequently indicates a weapon has not been removed from a bay of holster 102. In such an implementation, messages from a holster to a recorder need not include a payload; however, there exists a higher risk in such a system that a recorder may take action on receiving a message that is not authentic.

In another implementation, a message transmitted by a holster includes a payload comprising a signature. Only a message with a valid signature is deemed authentic. The payload and/or signature may in addition convey other information (e.g., manufacturer, model, brand, user associated with the holster). A valid signature comprises one or more bits having values wherein the values are sufficient to reduce a risk of the receiver taking action in response to a message that is not authentic. According to various aspects of the present invention, a valid signature comprises more than 3 bits. By including more than 3 bits in the signature, an invalid signature (e.g., unexpected message, interference, message corrupted by noise inaccuracy in communication) is not likely to be received and/or recognized as a valid signature.

In operation, consider the situation of a user wearing one holster 102 and one recorder 120 designed to communicate using a standard protocol in an environment where system 100 includes several holsters and several recorders worn by other persons and further includes any number of transmitters using a protocol that is the same or similar to the standard protocol. In such a situation, recorder 120 cannot rely on accurately receiving a message header to reject messages that are not authentic messages. The risk of taking action in response to messages that are not authentic is further increased when it is desired to implement system 100 with messages sent by holster 102 that may not include an address of recorder 120 and further may not include an address of holster 102. In this situation, recorder 120 accurately avoids taking action in response to a message that is not authentic by authenticating a signature that is included in the message.

Authenticating a received message includes any process that rejects a received message based on whether the signature of a payload meets predefined criteria. A message is deemed received when it complies with the communication protocol for the transmission, broadcast, or link. Criteria may be defined, generated, detected, and analyzed using any conventional technologies (e.g. encryption, nonce, time stamp, comparison to fixed value, comparison to range of values, comparison to set of values, decryption, knowledge of suitable values of the nonce, knowledge of time and expected communication delays).

Holster 102 and recorder 120 may use compatible keys and/or compatible algorithms for generating matching pseudorandom numbers. For example, a nonce may include a pseudorandom number generated by holster 102 for comparison to a pseudorandom number generated by recorder 120. If the comparison passes, then the received message is deemed authentic.

In another implementation, where synchronization of pseudorandom number generating algorithms is not necessary, the signature includes a nonce and a conventional cyclic redundancy check (CRC) code generated by holster 102. The nonce comprises a pseudo random number to assure that messages vary among holsters and over time from the same holster. If recorder 120 confirms that the CRC code (e.g., 4 bits) is correct for the nonce (e.g., 16 bits), then the signature and message are deemed authentic. Recorder 120 using conventional CRC technology reads the received nonce and CRC code (e.g., 20 bits) and applies a conventional algorithm that produces a predicted result (e.g., zero) when the received nonce and CRC code are suitably consistent with each other (e.g., reject all single and double bit inconsistencies, most burst inconsistencies rejected).

A server, as used herein, includes any conventional hardware and software that implements a network node that communicates via a local area network and/or a wide area network. Communication may be for review of recordings (e.g., DATA from recorder 320), storage of recordings, and/or annotation of recordings. A server may include capability to forward messages between networks. For example, a server may include a computing device, cellular telephone, or personal computer generally used by the user of recorder 320. In another implementation, the server includes conventional computer systems of a data center for communicating with a relatively large number of recorders (e.g., 20 to 20,000).

According to various aspects of the present invention, a holster, a recorder, and a server may communicate in a sequence of messages to accomplish reliable operation of a recorder in response to removal of a weapon from a holster. For example, message sequence 600 of FIG. 6 includes messages between a holster (e.g., 102 or 202), recorder 320, and server 602 at increasing times 604, 606, 608, 610, 612, and 614. Recorder 320 performs authenticating process 652 after time 606, performs controlling recording process 654 after authentication by process 652, performs authenticating process 666 after time 612; and performs controlling data communication with server process 668 after authentication by process 666.

At time 604 recorder 320 receives a WHITE LIST message from server 602. A white list includes one or more members where each member includes any information that identifies a holster. The white list may include indicia identifying the holster, as discussed above. The white list may include a signature associated with one or more holsters. A white list may include settings, variable, and/or instructions for authenticating a received signature. In a system 100 comprising any number of holsters and recorders, the white list may include members identifying a limited number of holsters. A received white list may supplement or replace a predefined white list stored in recorder 320. For example, in cross border police work, the holsters of one agency may be the exclusive members of a first white list and the holsters of the cross border agency may be the exclusive members of a second white list.

At time 606 a message is received by recorder 320 indicating a REMOVED signal (as discussed above), that is, that a weapon has been removed from a holster (e.g., 102 or 202). The message includes a payload comprising a received signature.

In response to the received message, controller 326 of recorder 320 performs authenticating process 652. If the received signature, satisfies all validity criteria, it is deemed valid and the message is deemed authentic. In that case authenticating process 652 enables further processing. Otherwise, authenticating process 652 disables further processing so that the message is rejected, that is, no action of controlling recording is taken in response to the message. The expected signature may be an expected constant, a member of the white list, and/or sufficient to satisfy any criteria of a member of a white list. For each message deemed authentic, controller 326 performs controlling recording process 654 in a manner to implement the START signal 328 and/or signals 346, as discussed above.

At time 608, in response to controlling recording process 654, recorder 320 transmits RECORDER STATUS to server 602 via wide area transceiver 354, as discussed above. RECORDER STATUS may include one or more messages indicating one or more of the following: the identity and status of recorder 320, date and time, identification of the user of recorder 320, and identification and/or description of the holster and/or weapon associated with the user. For example, when a user is associated with two weapons each associated with a particular holster, RECORDER STATUS may indicate which holster provided the REMOVED signal so that the weapon may be later identified or confirmed.

At time 610, in response to controlling recording process 654, recorder 320 transmits DATA to server 602 via wide area transceiver 354. DATA may include recordings. Recordings may include information from controller 326 and/or sensor 330 (e.g., streaming images, audio, and/or video; previously recorded still images, audio, and/or video).

At time 612 recorder 320 receives a RETURNED signal indicating a weapon has been returned into a bay of a holster (e.g., 102 or 202). In response to receiving the RETURNED message, controller 326 performs authenticating process 666 in a manner analogous to process 652, discussed above. A RETURNED message that is deemed unintended or unauthentic is rejected. Otherwise, controlling data communication with server process 668 is enabled for further processing.

A RETURNED signal may be a message transmitted or broadcast by a holster in response to an output (or cessation of the REMOVED signal) of a weapon in bay detector 104 or weapon in bay switch 204. In another implementation of system 100, a RETURNED signal corresponds to cessation of receiving REMOVED messages. For example, the RETURNED signal corresponds to receiving the last REMOVED message as determined by lapse of a predetermined time after a received REMOVED message during which no further REMOVED messages are received. Authenticating process 666 may in accordance with a lapse of the predetermined time enable further processing (668).

Controlling data communication with server process 668 manages further transmitting of DATA as discussed above to server 602 at time 614.

The foregoing description discusses preferred embodiments of the present invention, which may be changed or modified without departing from the scope of the present invention as defined in the claims. As used herein, the terms 'having', 'including', and 'comprising' are intended to convey an open rather than closed description. The examples listed in parentheses may be alternative or combined in any manner. As used in the specification and claims, the words "a" and "an" are used as indefinite articles meaning "one or more". The invention includes any practical combination of the structures and methods disclosed. While for the sake of clarity of description several specifics embodiments of the invention have been described, the scope of the invention is intended to be measured by the claims as set forth below.

What is claimed is:

1. A system for recording in response to removal of a provided weapon, the system comprising:
   a holster to be worn by a person, the holster for holding the weapon, the holster including:
      a detector that detects that the weapon is removed from the holster, the detector includes a magnet moveable between a first position and a second position, and an attractor; and
      a transmitter for transmitting a formatted message, the message includes indicia identifying the holster; and
   a recorder to be worn by the person, the recorder including:
      a camera that provides a video signal;
      a receiver that receives the message; and
      a controller, the controller includes a white list identifying one or more holsters; wherein:
         while the weapon is positioned in the holster, a first magnetic force of attraction between the magnet and the weapon moves the magnet to the second position;
         while the weapon is not positioned in the holster, a second magnetic force of attraction between the magnet and the attractor moves the magnet to the first position thereby indicating that the weapon is removed from the holster;
         a magnitude of the first magnetic force of attraction is greater than a magnitude of the second magnetic force of attraction;
         in response to the magnet moving into the first position, the transmitter broadcasts the message;
      the controller enables recording of the video in accordance with a comparison of the indicia identifying the holster and the white list.

2. The system of claim 1 wherein:
   the holster further comprises a power supply;
   while the magnet is in the first position, the transmitter receives power from the power supply to broadcast the message.

3. The system of claim 1 wherein the recorder comprises a second receiver that receives the white list.

4. The system of claim 1 wherein the formatting is in accordance with the Bluetooth Low Energy communication standard.

5. The system of claim 1 wherein the message further includes an address of the holster.

6. The system of claim 1 wherein
   the message further includes a signature; and
   the signature includes a nonce and a cyclic redundancy check code.

7. The system of claim 1 wherein the controller enables recording because the indicia identifying the holster is in the white list.

8. The system of claim 1 wherein the controller does not enable recording because the indicia identifying the holster is not in the white list.

9. A system for recording in response to removal of a weapon, the system comprising:
   a holster to be worn by a person, the holster for holding the weapon, the holster includes:
      a detector that detects that the weapon is removed from the holster, the detector includes a magnet moveable between a first position and a second position, and an attractor;
      a transmitter for transmitting a message, the message includes indicia identifying at least one of a manufacturer, a model, a brand, and a user of the holster; and
   a recorder, the recorder within wireless range of the holster, the recorder includes:
      a camera that provides a video signal;
      a receiver that receives the message; and
      a controller that includes a list that identifies at least one of the manufacturer, the model, the brand, and the user of one or more holsters, wherein:
         while the weapon is positioned in the holster, a first magnetic force of attraction between the magnet and the weapon moves the magnet to the second position;
         while the weapon is not positioned in the holster, a second magnetic force of attraction between the magnet and the attractor moves the magnet to the first position thereby indicating that the weapon is removed from the holster;

a magnitude of the first magnetic force of attraction is greater than a magnitude of the second magnetic force of attraction;

in response to the magnet moving into the first position, the transmitter transmits the message;

the controller enables recording of the video in accordance with a comparison of the indicia and the list.

10. The system of claim 9 wherein the recorder comprises a second receiver that receives the list.

11. The system of claim 9 wherein the indicia further comprise an address, the address used by the holster for transmitting the message.

12. The system of claim 9 wherein the indicia further comprise a signature.

13. The system of claim 9 wherein the message is transmitted as an advertisement in accordance with the Bluetooth Low Energy communications protocol.

14. The system of claim 9 wherein the controller enables recording because the indicia from the holster is in the list.

15. The system of claim 9 wherein the controller does not enable recording because the indicia from the holster is not in the list.

16. A holster to be worn by a person, the holster for holding a weapon, the holster comprising:

a detector, the detector detects at least one of removal of the weapon from the holster and return of the weapon to the holster, the detector includes a magnet moveable between a first position and a second position, and an attractor; and a transmitter that in response to the detector detecting at the least one of removal and return of the weapon transmits a message, the message includes indicia identifying the holster; wherein:

while the weapon is positioned in the holster, a first magnetic force of attraction between the magnet and the weapon moves the magnet to the second position;

while the weapon is not positioned in the holster, a second magnetic force of attraction between the magnet and the attractor moves the magnet to the first position;

a magnitude of the first magnetic force of attraction is greater than a magnitude of the second magnetic force of attraction;

while the magnet is positioned in the first position, the detector determines that the weapon has been removed from the holster; and while the magnet is not positioned in the first position, the detector determines that the weapon is positioned in the holster.

17. The holster of claim 16 wherein:

the detector further comprises a first contact and a second contact;

while the magnet is positioned in the first position, the magnet abuts the first contact and the second contact to establish an electrical connection.

18. The holster of claim 17 wherein the transmitter transmits the message responsive to establishing the electrical connection.

19. The holster of claim 16 wherein:

the holster further comprises a power supply, a first contact, and a second contact;

the magnet, the first contact, and the second contact cooperate to perform the function of a switch;

while the magnet is positioned in the first position, the magnet abuts the first contact and the second contact to close the switch; and responsive to closing the switch, the transmitter receives power from the power supply to transmit the message.

20. The holster of claim 16 wherein the attractor comprises a magnet.

* * * * *